(12) United States Patent
Norvelle

(10) Patent No.: US 6,359,222 B1
(45) Date of Patent: Mar. 19, 2002

(54) TELESCOPING POWER PANEL

(76) Inventor: Ronald D. Norvelle, 5375 Airpark Leap West, Green Cove Springs, FL (US) 32043

( * ) Notice: Subject to any disclaimer, the term of this patent is extended or adjusted under 35 U.S.C. 154(b) by 0 days.

(21) Appl. No.: 09/467,278

(22) Filed: Dec. 20, 1999

(51) Int. Cl.$^7$ ................................................. H01H 9/02
(52) U.S. Cl. ............................ 174/57; 174/50; 220/37
(58) Field of Search ............................. 174/48, 58, 60, 174/63, 67, 50, 57; 220/3.2, 3.3, 3.9, 3.7

(56) References Cited

U.S. PATENT DOCUMENTS

| | | | | |
|---|---|---|---|---|
| 3,386,606 A | * | 6/1968 | Pastrick | 174/50 |
| 3,573,344 A | | 4/1971 | Snyder | 174/57 |
| 3,928,716 A | | 12/1975 | Marrero | 174/57 |
| 3,955,701 A | | 5/1976 | Fisch | 220/3.7 |
| 4,535,577 A | * | 8/1985 | Tenser et al. | 174/48 |
| 4,737,599 A | * | 4/1988 | Fontaine | 174/67 |
| 4,857,004 A | * | 8/1989 | Poirier | 174/67 |
| 5,066,832 A | * | 11/1991 | Clarey et al. | 174/50 |
| 5,463,533 A | | 10/1995 | Donnerstag | 361/825 |
| 5,596,174 A | | 1/1997 | Sapienza | 174/57 |
| 5,619,013 A | | 4/1997 | Jorgensen | 174/53 |
| 6,111,196 A | * | 8/2000 | Arai | 174/50 |
| 6,172,298 B1 | * | 1/2001 | Norvelle | 174/48 |

* cited by examiner

*Primary Examiner*—Dean A. Reichard
*Assistant Examiner*—Angel R. Estrada
(74) *Attorney, Agent, or Firm*—Joseph N. Breaux

(57) ABSTRACT

A power panel that is collapsed during installation of wires, cables and the like and then expandable to completely fill the opening cut into the wall for receiving the power panel. The power panel includes an upper panel assembly and a lower panel assembly that are attached via a slide arrangement formed between spaced right, left and back vertical insertion plates and it's respect separate right, left or back vertical insertion plate receiving cavity.

1 Claim, 4 Drawing Sheets

TELESCOPING POWER PANEL

Applicant hereby incorporates by reference herein Discloser Document No 449466 received by the Patent and Trademark Office on Jan. 4, 1999.

TECHNICAL FIELD

The present invention relates to electrical power panels and more particularly to a telescoping power panel that includes an upper panel assembly, a lower panel assembly, and two securing bolt assemblies for securing the upper panel assembly in a fixed relationship to the lower panel assembly; the lower panel assembly including a lower box structure and a lower telescoping assembly; the lower box structure having a lower vertical back panel section, lower left and right vertical panel sections integrally formed, respectively, along opposed left and right side edges of the lower vertical back panel section, and a lower horizontal panel section integrally formed with the lower vertical back panel section along a lower side edge and having left and right lower horizontal panel section end edges secured, respectively, at right angles to the lower left and right vertical panel sections; the lower horizontal panel section having a number of cable passage punch out plugs provided therein positioned within a like number of cable passageways provided therethrough; the lower telescoping assembly including a left insertion plate having a pair of elongated parallel bolt passage slots formed therethrough, a right insertion plate having a pair of elongated parallel bolt passage slots formed therethrough and a back insertion plate; the left insertion plate being integrally formed with a top end surface of the lower left vertical panel section and extending away from the lower horizontal panel section at a right angle; the right insertion plate being integrally formed with a top end surface of the lower right vertical panel section and extending away from the lower horizontal panel section at a right angle and in parallel orientation with the left insertion plate; the back insertion plate being integrally formed with a top end surface of the lower vertical back panel section and extending away from the lower horizontal panel section, the left insertion plate and the right insertion plate at a right angle such that a first gap is provided between a left side of the back insertion plate and the left insertion plate and a second gap is provided between a right side of the back insertion plate and the right insertion plate; the upper panel assembly having an upper vertical back panel section, upper left and right vertical panel sections integrally formed, respectively, along opposed left and right side edges of the upper vertical back panel section, and an upper horizontal panel section integrally formed with the upper vertical back panel section along an upper side edge and having left and right upper horizontal panel section end edges secured, respectively, at right angles to the upper left and right vertical panel sections; the upper horizontal panel section having a number of cable passage punch out plugs provided therein positioned within a like number of cable passageways provided therethrough; the upper left vertical panel section having a left insertion plate receiving cavity formed therein sized to slidingly receive the left insertion plate therein and a pair of concentrically aligned opposed bolt passage holes formed therethrough and arranged such that when the left insertion plate is inserted into the left insertion plate receiving cavity the bolt passage holes are aligned with a section of the elongated parallel bolt passage slots of the left insertion plate; the upper right vertical panel section having a right insertion plate receiving cavity formed therein sized to slidingly receive the right insertion plate therein and a pair of concentrically aligned opposed bolt passage holes formed therethrough and arranged such that when the right insertion plate is inserted into the right insertion late receiving cavity the bolt passage holes are aligned with a section of the elongated parallel bolt passage slots of the right insertion plate; the upper vertical back panel section having a back insertion plate receiving cavity formed therein sized to slidingly receive the back insertion plate therein; the left insertion plate receiving cavity, the right insertion plate receiving cavity, and the back insertion plate receiving cavity being positioned with respect to each other such that the left insertion plate, the right insertion plate and the back insertion plate are, respectively, simultaneously insertable into the left insertion plate receiving cavity, the right insertion plate receiving cavity, and the back insertion plate receiving cavity, and positionable such that the distance between the lower horizontal panel section and the upper horizontal panel section is variable; each of the two securing bolt assemblies including a bolt, a washer and a wing nut.

BACKGROUND ART

It can often be difficult to install wiring and the like into a standard power panel because the opening into the wall is cut to the same dimensions as the power panel. It would be a benefit, therefore, to have a power panel that could be collapsed during installation of wires, cables and the like and then expanded to completely fill the opening cut into the wall for receiving the power panel.

GENERAL SUMMARY DISCUSSION OF INVENTION

It is thus an object of the invention to provide a telescoping power panel that includes an upper panel assembly, a lower panel assembly, and two securing bolt assemblies for securing the upper panel assembly in a fixed relationship to the lower panel assembly; the lower panel assembly including a lower box structure and a lower telescoping assembly; the lower box structure having a lower vertical back panel section, lower left and right vertical panel sections integrally formed, respectively, along opposed left and right side edges of the lower vertical back panel section, and a lower horizontal panel section integrally formed with the lower vertical back panel section along a lower side edge and having left and right lower horizontal panel section end edges secured, respectively, at right angles to the lower left and right vertical panel sections; the lower horizontal panel section having a number of cable passage punch out plugs provided therein positioned within a like number of cable passageways provided therethrough; the lower telescoping assembly including a left insertion plate having a pair of elongated parallel bolt passage slots formed therethrough, a right insertion plate having a pair of elongated parallel bolt passage slots formed therethrough and a back insertion plate; the left insertion plate being integrally formed with a top end surface of the lower left vertical panel section and extending away from the lower horizontal panel section at a right angle; the right insertion plate being integrally formed with a top end surface of the lower right vertical panel section and extending away from the lower horizontal panel section at a right angle and in parallel orientation with the left insertion plate; the back insertion plate being integrally formed with a top end surface of the lower vertical back panel section and extending away from the lower horizontal panel section, the left insertion plate and the right insertion plate at a right angle such that a first gap is provided between a left side of the back insertion plate and the left insertion plate and a second gap is provided between a right side of the back insertion plate and the right insertion plate; the upper panel assembly having an upper vertical back panel section, upper left and right vertical panel sections integrally formed, respectively, along opposed left and right side edges of the upper vertical back panel section, and an upper horizontal panel section integrally formed with the upper vertical back panel section along an upper side edge and having left and right upper horizontal panel section end edges secured, respectively, at right angles to the upper left and right vertical panel sections; the upper horizontal panel section having a number of cable passage punch out plugs provided therein positioned within a like number of cable passageways provided therethrough; the upper left vertical panel section having a left insertion plate receiving cavity formed therein sized to slidingly receive the left insertion plate therein and a pair of concentrically aligned opposed bolt passage holes formed therethrough and arranged such that when the left insertion plate is inserted into the left insertion plate receiving cavity the bolt passage holes are aligned with a section of the elongated parallel bolt passage slots of the left insertion plate; the upper right vertical panel section having a right insertion plate receiving cavity formed therein sized to slidingly receive the right insertion plate therein and a pair of concentrically aligned opposed bolt passage holes formed therethrough and arranged such that when the right insertion plate is inserted into the right insertion late receiving cavity the bolt passage holes are aligned with a section of the elongated parallel bolt passage slots of the right insertion plate; the upper vertical back panel section having a back insertion plate receiving cavity formed therein sized to slidingly receive the back insertion plate therein; the left insertion plate receiving cavity, the right insertion plate receiving cavity, and the back insertion plate receiving cavity being positioned with respect to each other such that the left insertion plate, the right insertion plate and the back insertion plate are, respectively, simultaneously insertable into the left insertion plate receiving cavity, the right insertion plate receiving cavity, and the back insertion plate receiving cavity, and positionable such that the distance between the lower horizontal panel section and the upper horizontal panel section is variable; each of the two securing bolt assemblies including a bolt, a washer and a wing nut.

Accordingly, a telescoping power panel is provided. The telescoping power panel includes an upper panel assembly, a lower panel assembly, and two securing bolt assemblies for securing the upper panel assembly in a fixed relationship to the lower panel assembly; the lower panel assembly including a lower box structure and a lower telescoping assembly; the lower box structure having a lower vertical back panel section, lower left and right vertical panel sections integrally formed, respectively, along opposed left and right side edges of the lower vertical back panel section, and a lower horizontal panel section integrally formed with the lower vertical back panel section along a lower side edge and having left and right lower horizontal panel section end edges secured, respectively, at right angles to the lower left and right vertical panel sections; the lower horizontal panel section having a number of cable passage punch out plugs provided therein positioned within a like number of cable passageways provided therethrough; the lower telescoping assembly including a left insertion plate having a pair of elongated parallel bolt passage slots formed therethrough, a right insertion plate having a pair of elongated parallel bolt passage slots formed therethrough and a back insertion plate; the left insertion plate being integrally formed with a top end surface of the lower left vertical panel section and extending away from the lower horizontal panel section at a right angle; the right insertion plate being integrally formed with a top end surface of the lower right vertical panel section and extending away from the lower horizontal panel section at a right angle and in parallel orientation with the left insertion plate; the back insertion plate being integrally formed with a top end surface of the lower vertical back panel section and extending away from the lower horizontal panel section, the left insertion plate and the right insertion plate at a right angle such that a first gap is provided between a left side of the back insertion plate and the left insertion plate and a second gap is provided between a right side of the back insertion plate and the right insertion plate; the upper panel assembly having an upper vertical back panel section, upper left and right vertical panel sections integrally formed, respectively, along opposed left and right side edges of the upper vertical back panel section, and an upper horizontal panel section integrally formed with the upper vertical back panel section along an upper side edge and having left and right upper horizontal panel section end edges secured, respectively, at right angles to the upper left and right vertical panel sections; the upper horizontal panel section having a number of cable passage punch out plugs provided therein positioned within a like number of cable passageways provided therethrough; the upper left vertical panel section having a left insertion plate receiving cavity formed therein sized to slidingly receive the left insertion plate therein and a pair of concentrically aligned opposed bolt passage holes formed therethrough and arranged such that when the left insertion plate is inserted into the left insertion plate receiving cavity the bolt passage holes are aligned with a section of the elongated parallel bolt passage slots of the left insertion plate; the upper right vertical panel section having a right insertion plate receiving cavity formed therein sized to slidingly receive the right insertion plate therein and a pair of concentrically aligned opposed bolt passage holes formed therethrough and arranged such that when the right insertion plate is inserted into the right insertion late receiving cavity the bolt passage holes are aligned with a section of the elongated parallel bolt passage slots of the right insertion plate; the upper vertical back panel section having a back insertion plate receiving cavity formed therein sized to slidingly receive the back insertion plate therein; the left insertion plate receiving cavity, the right insertion plate receiving cavity, and the back insertion plate receiving cavity being positioned with respect to each other such that the left insertion plate, the right insertion plate and the back insertion plate are, respectively, simultaneously insertable into the left insertion plate receiving cavity, the right insertion plate receiving cavity, and the back insertion plate receiving cavity, and positionable such that the distance between the lower horizontal panel section and the upper horizontal panel section is variable; each of the two securing bolt assemblies including a bolt, a washer and a wing nut.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
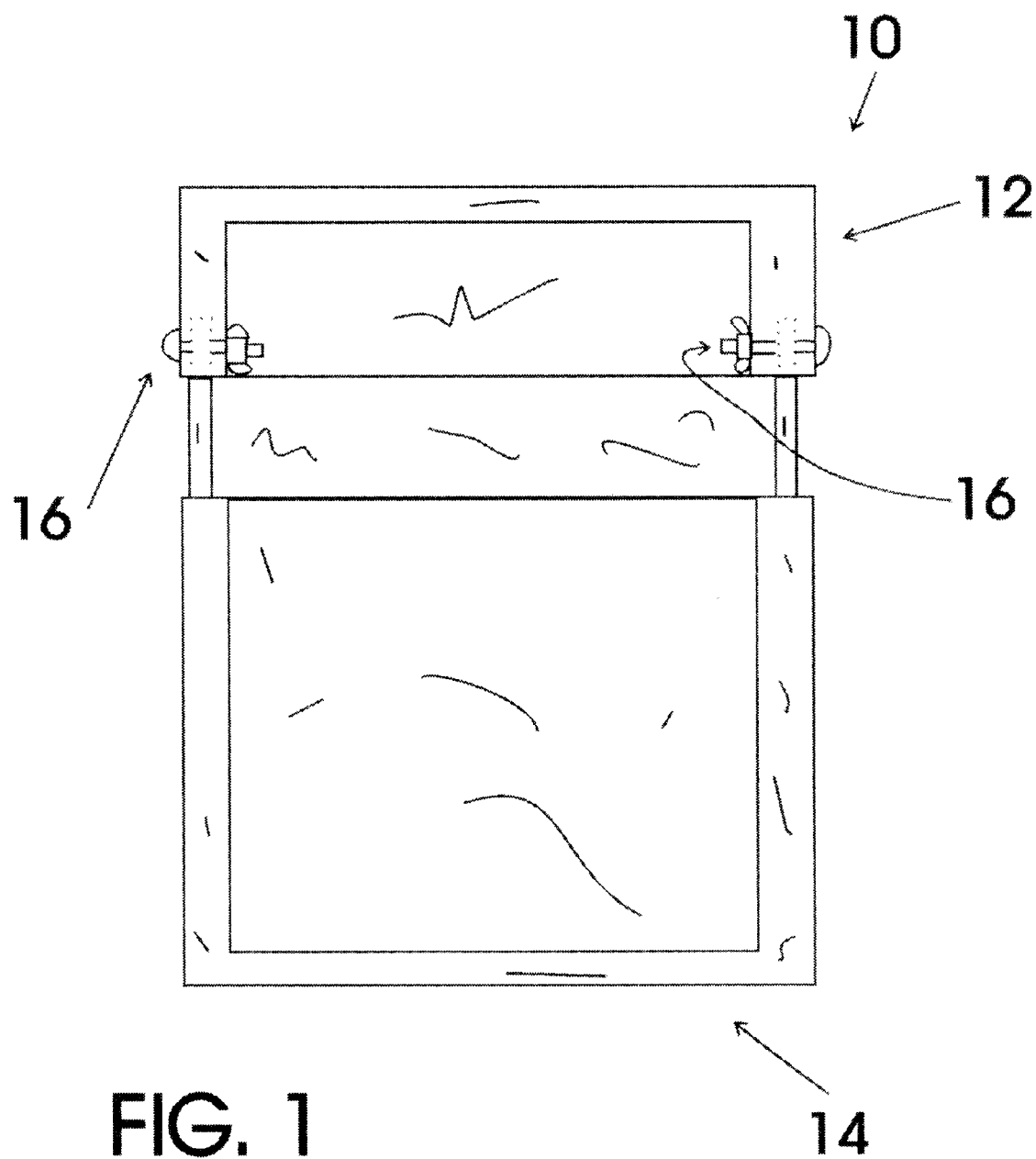
FIG. 1 is a front plan view of an exemplary embodiment of the telescoping power panel of the present invention showing the upper panel assembly slidably mounted onto the lower panel assembly and secured to the lower panel assembly with two securing bolt assemblies; the lower panel assembly including a lower box structure and a lower telescoping assembly; the lower box structure having a lower vertical back panel section, lower left and right vertical panel sections integrally formed, respectively, along opposed left and right side edges of the lower vertical back panel section, and a lower horizontal panel section integrally formed with the lower vertical back panel section along a lower side edge and having left and right lower horizontal panel section end edges secured, respectively, at right angles to the lower left and right vertical panel sections; the lower horizontal panel section having a number of cable passage punch out plugs provided therein positioned within a like number of cable passageways provided therethrough; the lower telescoping assembly including a left insertion plate having a pair of elongated parallel bolt passage slots formed therethrough, a right insertion plate having a pair of elongated parallel bolt passage slots formed therethrough and a back insertion plate; the left insertion plate being integrally formed with a top end surface of the lower left vertical panel section and extending away from the lower horizontal panel section at a right angle; the right insertion plate being integrally formed with a top end surface of the lower right vertical panel section and extending away from the lower horizontal panel section at a right angle and in parallel orientation with the left insertion plate; the back insertion plate being integrally formed with a top end surface of the lower vertical back panel section and extending away from the lower horizontal panel section, the left insertion plate and the right insertion plate at a right angle such that a first gap is provided between a left side of the back insertion plate and the left insertion plate and a second gap is provided between a right side of the back insertion plate and the right insertion plate; the upper panel assembly having an upper vertical back panel section, upper left and right vertical panel sections integrally formed, respectively, along opposed left and right side edges of the upper vertical back panel section, and an upper horizontal panel section integrally formed with the upper vertical back panel section along an upper side edge and having left and right upper horizontal panel section end edges secured, respectively, at right angles to the upper left and right vertical panel sections; the upper horizontal panel section having a number of cable passage punch out plugs provided therein positioned within a like number of cable passageways provided therethrough; the upper left vertical panel section having a left insertion plate receiving cavity formed therein sized to slidingly receive the left insertion plate therein and a pair of concentrically aligned opposed bolt passage holes formed therethrough and arranged such that when the left insertion plate is inserted into the left insertion plate receiving cavity the bolt passage holes are aligned with a section of the elongated parallel bolt passage slots of the left insertion plate; the upper right vertical panel section having a right insertion plate receiving cavity formed therein sized to slidingly receive the right insertion plate therein and a pair of concentrically aligned opposed bolt passage holes formed therethrough and arranged such that when the right insertion plate is inserted into the right insertion late receiving cavity the bolt passage holes are aligned with a section of the elongated parallel bolt passage slots of the right insertion plate; the upper vertical back panel section having a back insertion plate receiving cavity formed therein sized to slidingly receive the back insertion plate therein; the left insertion plate receiving cavity, the right insertion plate receiving cavity, and the back insertion plate receiving cavity being positioned with respect to each other such that the left insertion plate, the right insertion plate and the back insertion plate are, respectively, simultaneously insertable into the left insertion plate receiving cavity, the right insertion plate receiving cavity, and the back insertion plate receiving cavity, and positionable such that the distance between the lower horizontal panel section and the upper horizontal panel section is variable; each of the two securing bolt assemblies including a bolt, a washer and a wing nut.

FIG. 1 shows an exemplary embodiment of the telescoping power panel of the present invention generally designated 10. Telescoping power panel 10 includes an upper panel assembly, generally designated 12; a lower panel assembly, generally designated 14; and two securing bolt assemblies, each generally designated 16, for securing upper panel assembly 12 in a fixed relationship to lower panel assembly 14.

Figure 2:
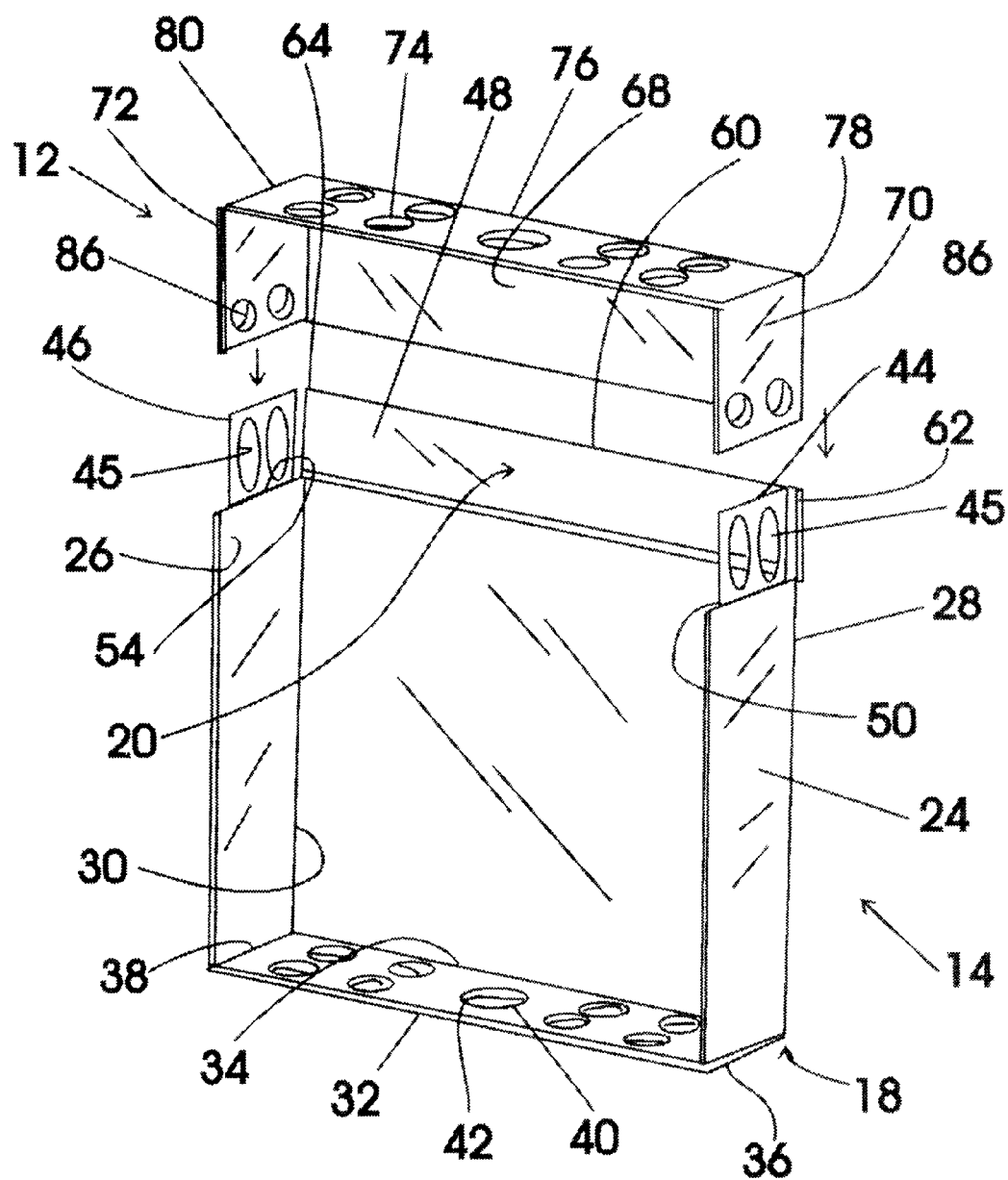
FIG. 2 is a perspective view of the of the telescoping power panel of FIG. 1 with the securing bolt assemblies removed and the upper panel assembly disengaged from the lower panel assembly.

Referring to FIG. 2, lower panel assembly 14 includes a lower box structure, generally designated 18, and a lower telescoping assembly, generally designated 20. Lower box structure 18 has a lower vertical back panel section 22, lower left and right vertical panel sections 24,26 integrally formed, respectively, along opposed left and right side edges 28,30 of lower vertical back panel section 22, and a lower horizontal panel section 32 integrally formed with lower vertical back panel section 22 along a lower side edge 34 and having left and right lower horizontal panel section end edges 36,38 secured, respectively, at right angles to lower left and right vertical panel sections 24,26. Lower horizontal panel section 32 has a number of cable passage punch out plugs 40 provided therein positioned within a like number of cable passageways 42 provided therethrough.

Lower telescoping assembly 20 includes a left insertion plate 44 having a pair of elongated parallel bolt passage slots 45 formed therethrough, a right insertion plate 46 having a pair of elongated parallel bolt passage slots 45 formed therethrough and a back insertion plate 48. Left insertion plate 44 is integrally formed with a top end surface 50 of lower left vertical panel section 24 and extends away from lower horizontal panel section 32 at a right angle. Right insertion plate 46 is integrally formed with a top end surface 54 of lower right vertical panel section 26 and extends away from lower horizontal panel section 32 at a right angle and in parallel orientation with left insertion plate 44. Back insertion plate 48 is integrally formed with a top end surface 60 of lower vertical back panel section 22 and extends away from lower horizontal panel section 32, left insertion plate 44 and right insertion plate 46 at a right angle such that a first gap 62 is provided between a left side of back insertion plate 48 and left insertion plate 44 and a second gap 64 is provided between a right side of back insertion plate 48 and right insertion plate 46.

Upper panel assembly 12 has an upper vertical back panel section 68, upper left and right vertical panel sections 70,72 integrally formed, respectively, along opposed left and right side edges of upper vertical back panel section 68, and an upper horizontal panel section 74 integrally formed with upper vertical back panel section 68 along an upper side edge 76 and having left and right upper horizontal panel section end edges 78,80 secured, respectively, at right angles to upper left and right vertical panel sections 70,72.

Figure 3:
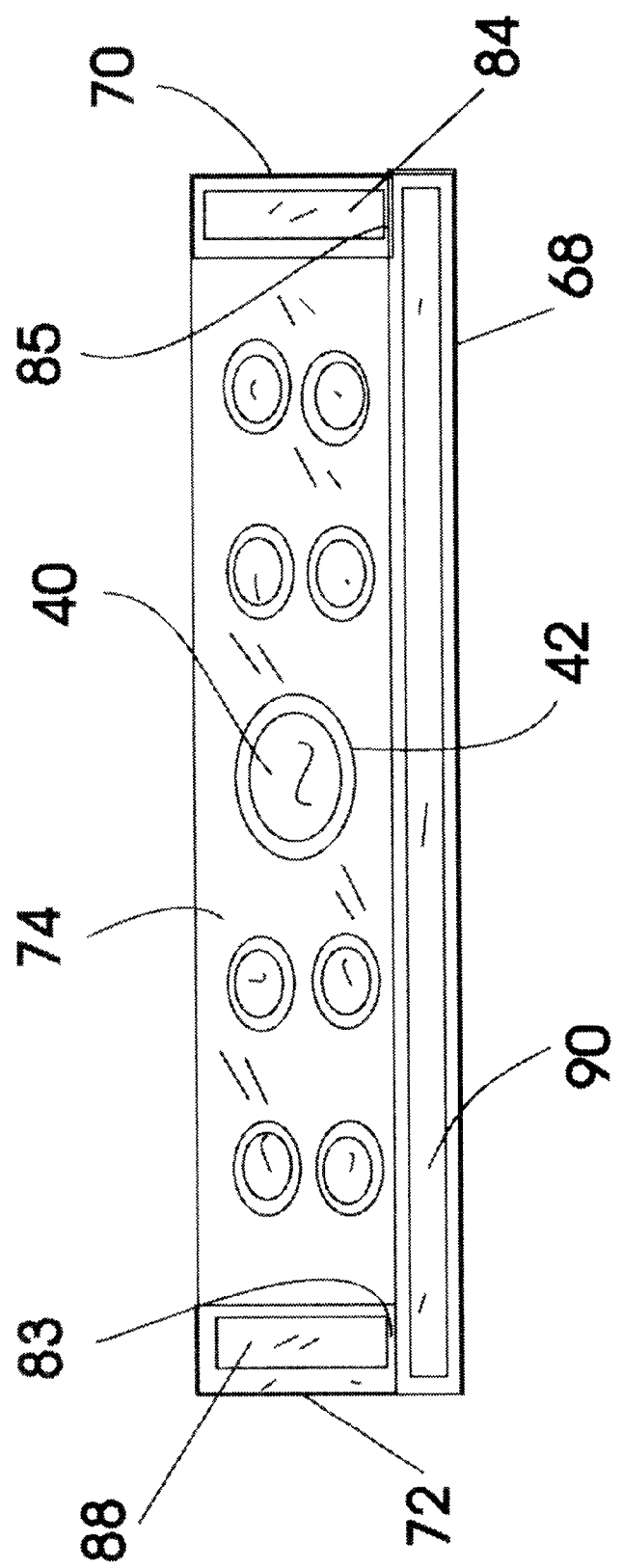
FIG. 3 is a bottom end plan view of the upper panel assembly showing the left insertion plate receiving cavity, the right insertion plate receiving cavity and the back insertion plate receiving cavity.

Referring to FIG. 3, upper horizontal panel section 74 has a number of cable passage punch out plugs 40 provided therein positioned within a like number of cable passageways 42 provided therethrough. Upper left vertical panel section 70 has a left insertion plate receiving cavity 84 formed therein sized to slidingly receive left insertion plate 44 (FIG. 2) therein and a pair of concentrically aligned opposed bolt passage holes 86 (FIG. 2) formed therethrough. Upper right vertical panel section 72 has a right insertion plate receiving cavity 88 formed therein sized to slidingly receive right insertion plate 46 (FIG. 2) therein and a pair of concentrically aligned opposed bolt passage holes 86 (FIG. 2). Upper vertical back panel section 68 has a back insertion plate receiving cavity 90 formed therein sized to slidingly receive back insertion plate 48 therein.

Referring generally to FIGS. 1–4, left insertion plate receiving cavity 84 is separated from back insertion plate receiving cavity 90 by a first separation structure 83 and right insertion plate receiving cavity 88 is separated from back insertion plate receiving cavity 90 by a second separating structure 85. Left insertion plate receiving cavity 84, right insertion plate receiving cavity 88, back insertion plate receiving cavity 90, first separation structure 83 and second separation structure 85 are positioned with respect to each other such that left insertion plate 44, right insertion plate 46, back insertion plate 48, first separation structure 83 and second separation structure 85 are, respectively, simultaneously insertable into left insertion plate receiving cavity 84, right insertion plate receiving cavity 88, back insertion plate receiving cavity 90, first gap 62 and a second gap 64 and positionable such that the distance between the lower horizontal panel section 32 and upper horizontal panel section 74 is variable.

Figure 4:
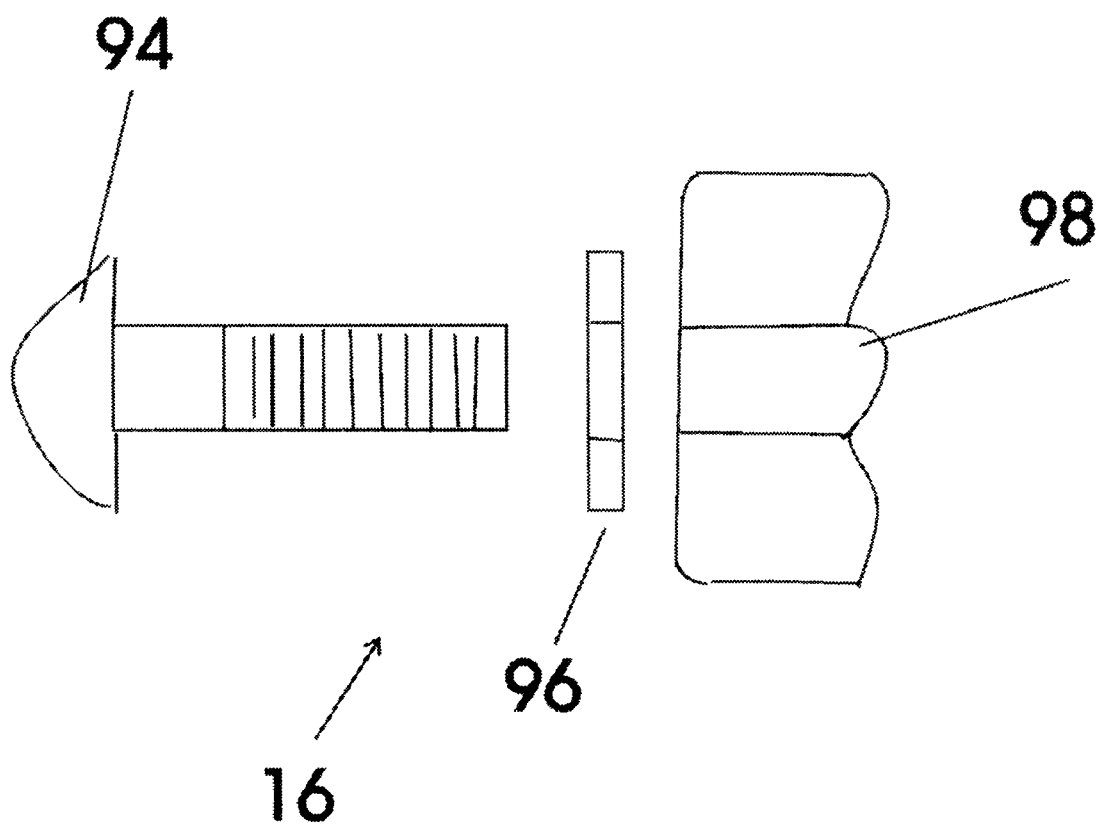
FIG. 4 is an exploded side plan view of one of the two securing bolt assemblies showing the bolt, the washer and the wing nut.

Referring to FIG. 4, each of the two securing bolt assemblies 16 including a carriage bolt 94, a washer 96 and a wing nut 98.

It can be seen from the preceding description that a telescoping power panel has been provided that includes an upper panel assembly, a lower panel assembly, and two securing bolt assemblies for securing the upper panel assembly in a fixed relationship to the lower panel assembly; the lower panel assembly including a lower box structure and a lower telescoping assembly; the lower box structure having a lower vertical back panel section, lower left and right vertical panel sections integrally formed, respectively, along opposed left and right side edges of the lower vertical back panel section, and a lower horizontal panel section integrally formed with the lower vertical back panel section along a lower side edge and having left and right lower horizontal panel section end edges secured, respectively, at right angles to the lower left and right vertical panel sections; the lower horizontal panel section having a number of cable passage punch out plugs provided therein positioned within a like number of cable passageways provided therethrough; the lower telescoping assembly including a left insertion plate having a pair of elongated parallel bolt passage slots formed therethrough, a right insertion plate having a pair of elongated parallel bolt passage slots formed therethrough and a back insertion plate; the left insertion plate being integrally formed with a top end surface of the lower left vertical panel section and extending away from the lower horizontal panel section at a right angle; the right insertion plate being integrally formed with a top end surface of the lower right vertical panel section and extending away from the lower horizontal panel section at a right angle and in parallel orientation with the left insertion plate; the back insertion plate being integrally formed with a top end surface of the lower vertical back panel section and extending away from the lower horizontal panel section, the left insertion plate and the right insertion plate at a right angle such that a first gap is provided between a left side of the back insertion plate and the left insertion plate and a second gap is provided between a right side of the back insertion plate and the right insertion plate; the upper panel assembly having an upper vertical back panel section, upper left and right vertical panel sections integrally formed, respectively, along opposed left and right side edges of the upper vertical back panel section, and an upper horizontal panel section integrally formed with the upper vertical back panel section along an upper side edge and having left and right upper horizontal panel section end edges secured, respectively, at right angles to the upper left and right vertical panel sections; the upper horizontal panel section having a number of cable passage punch out plugs provided therein positioned within a like number of cable passageways provided therethrough; the upper left vertical panel section having a left insertion plate receiving cavity formed therein sized to slidingly receive the left insertion plate therein and a pair of concentrically aligned opposed bolt passage holes formed therethrough and arranged such that when the left insertion plate is inserted into the left insertion plate receiving cavity the bolt passage holes are aligned with a section of the elongated parallel bolt passage slots of the left insertion plate; the upper right vertical panel section having a right insertion plate receiving cavity formed therein sized to slidingly receive the right insertion plate therein and a pair of concentrically aligned opposed bolt passage holes formed therethrough and arranged such that when the right insertion plate is inserted into the right insertion late receiving cavity the bolt passage holes are aligned with a section of the elongated parallel bolt passage slots of the right insertion plate; the upper vertical back panel section having a back insertion plate receiving cavity formed therein sized to slidingly receive the back insertion plate therein; the left insertion plate receiving cavity, the right insertion plate receiving cavity, and the back insertion plate receiving cavity being positioned with respect to each other such that the left insertion plate, the right insertion plate and the back insertion plate are, respectively, simultaneously insertable into the left insertion plate receiving cavity, the right insertion plate receiving cavity, and the back insertion plate receiving cavity, and positionable such that the distance between the lower horizontal panel section and the upper horizontal panel section is variable; each of the two securing bolt assemblies including a bolt, a washer and a wing nut.

It is noted that the embodiment of the telescoping power panel described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A telescoping power panel comprising:

an upper panel assembly;

a lower panel assembly; and two securing bolt assemblies for securing said upper panel assembly in a fixed relationship to said lower panel assembly;

said lower panel assembly including a lower box structure and a lower telescoping assembly;

said lower box structure having a lower vertical back panel section, lower left and right vertical panel sections integrally formed, respectively, along opposed left and right side edges of said lower vertical back panel section, and a lower horizontal panel section integrally formed with said lower vertical back panel section along a lower side edge and having left and right lower horizontal panel section end edges secured, respectively, at right angles to said lower left and right vertical panel sections;

said lower horizontal panel section having a number of cable passage punch out plugs provided therein positioned within a like number of cable passageways provided therethrough;

said lower telescoping assembly including a left insertion plate having a pair of elongated parallel bolt passage slots formed therethrough, a right insertion plate having a pair of elongated parallel bolt passage slots formed therethrough and a back insertion plate;

said left insertion plate being integrally formed with a top end surface of said lower left vertical panel section and extending away from said lower horizontal panel section at a right angle;

said right insertion plate being integrally formed with a top end surface of said lower right vertical panel section and extending away from said lower horizontal panel section at a right angle and in parallel orientation with said left insertion plate;

said back insertion plate being integrally formed with a top end surface of said lower vertical back panel section and extending away from said lower horizontal panel section, said left insertion plate and said right insertion plate at a right angle such that a first gap is provided between a left side of said back insertion plate and said left insertion plate and a second gap is provided between a right side of said back insertion plate and said right insertion plate;

said upper panel assembly having an upper vertical back panel section, upper left and right vertical panel sections integrally formed, respectively, along opposed left and right side edges of said upper vertical back panel section, and an upper horizontal panel section integrally formed with said upper vertical back panel section along an upper side edge and having left and right upper horizontal panel section end edges secured, respectively, at right angles to said upper left and right vertical panel sections;

said upper horizontal panel section having a number of cable passage punch out plugs provided therein positioned within a like number of cable passageways provided therethrough;

said upper left vertical panel section having a left insertion plate receiving cavity formed therein sized to slidingly receive said left insertion plate therein and a pair of concentrically aligned opposed bolt passage holes formed therethrough and arranged such that when said left insertion plate is inserted into said left insertion plate receiving cavity said bolt passage holes are aligned with a section of said elongated parallel bolt passage slots of said left insertion plate;

said upper right vertical panel section having a right insertion plate receiving cavity formed therein sized to slidingly receive said right insertion plate therein and a pair of concentrically aligned opposed bolt passage holes formed therethrough and arranged such that when said right insertion plate is inserted into said right insertion late receiving cavity said bolt passage holes are aligned with a section of said elongated parallel bolt passage slots of said right insertion plate;

said upper vertical back panel section having a back insertion plate receiving cavity formed therein sized to slidingly receive said back insertion plate therein;

said left insertion plate receiving cavity being separated from said back insertion plate receiving cavity by a first separation structure and said right insertion plate receiving cavity being separated from said back insertion plate receiving cavity by a second separating structure;

said left insertion plate receiving cavity, said right insertion plate receiving cavity, said back insertion plate receiving cavity, said first separation structure and said second separation structure being positioned with respect to each other such that said Left insertion plate, said right insertion plate, said back insertion plate, said first separation structure and said second separation structure are, respectively, simultaneously insertable into said left insertion plate receiving cavity, said right insertion plate receiving cavity, said back insertion plate receiving cavity, said first gap and said second gap and positionable such that said distance between said lower horizontal panel section and said upper horizontal panel section is variable;

each of said two securing bolt assemblies including a bolt, a washer and a wing nut.

* * * * *